US008841362B2

(12) United States Patent
Favis et al.

(10) Patent No.: US 8,841,362 B2
(45) Date of Patent: Sep. 23, 2014

(54) THERMOPLASTIC STARCH AND SYNTHETIC POLYMER BLENDS AND METHOD OF MAKING

(75) Inventors: Basil D. Favis, Kirkland (CA); Zhenhua Yuan, Laval (CA); Danut Riscanu, Terrebonne (CA)

(73) Assignee: Polyvalor, Limited Partnership, Montreal (CA)

( * ) Notice: Subject to any disclaimer, the term of this patent is extended or adjusted under 35 U.S.C. 154(b) by 485 days.

(21) Appl. No.: 11/912,045

(22) PCT Filed: Apr. 28, 2006

(86) PCT No.: PCT/CA2006/000695
§ 371 (c)(1),
(2), (4) Date: Jun. 24, 2008

(87) PCT Pub. No.: WO2006/116861
PCT Pub. Date: Nov. 9, 2006

(65) Prior Publication Data
US 2008/0287592 A1 Nov. 20, 2008

Related U.S. Application Data

(60) Provisional application No. 60/675,913, filed on Apr. 29, 2005, provisional application No. 60/691,772, filed on Jun. 20, 2005.

(51) Int. Cl.
| C08L 3/00 | (2006.01) |
| C08L 89/00 | (2006.01) |
| D21H 19/54 | (2006.01) |
| C08B 31/00 | (2006.01) |
| C08G 63/48 | (2006.01) |
| C08G 63/91 | (2006.01) |
| C08J 3/00 | (2006.01) |
| C08L 23/04 | (2006.01) |
| C08J 5/18 | (2006.01) |
| C08L 3/02 | (2006.01) |
| C08L 23/06 | (2006.01) |

(52) U.S. Cl.
CPC .............. *C08J 3/005* (2013.01); *C08J 2323/06* (2013.01); *C08L 23/04* (2013.01); *C08J 5/18* (2013.01); *C08L 3/02* (2013.01); *C08L 23/06* (2013.01); *C08J 2303/00* (2013.01)
USPC .......................................... 524/47; 525/54.31

(58) Field of Classification Search
USPC .......................................... 525/54.31; 524/47
See application file for complete search history.

(56) References Cited

U.S. PATENT DOCUMENTS

| 5,292,782 A * | 3/1994 | Bastioli et al. ................ 524/47 |
| 5,844,023 A | 12/1998 | Tomka |
| 6,011,092 A * | 1/2000 | Seppala et al. ................ 524/47 |
| 6,235,815 B1 * | 5/2001 | Loercks et al. ................ 524/47 |
| 6,348,524 B2 | 2/2002 | Bastioli et al. |
| 6,605,657 B1 * | 8/2003 | Favis et al. ................ 524/52 |
| 6,821,588 B1 * | 11/2004 | Hammer et al. ............. 428/34.8 |
| 6,844,380 B2 * | 1/2005 | Favis et al. ................ 524/52 |
| 6,933,335 B1 * | 8/2005 | Berger et al. ................ 524/47 |
| 7,176,251 B1 * | 2/2007 | Bastioli et al. ................ 524/47 |
| 2004/0122135 A1 * | 6/2004 | Halley et al. ................ 524/47 |
| 2007/0123612 A1 * | 5/2007 | Bastioli et al. ................ 524/47 |
| 2007/0129468 A1 * | 6/2007 | Bastioli et al. ................ 524/47 |
| 2008/0188593 A1 * | 8/2008 | Bastioli et al. ................ 524/35 |
| 2009/0005472 A1 * | 1/2009 | Bastioli et al. ................ 524/28 |
| 2010/0003434 A1 * | 1/2010 | Bastioli et al. ............. 428/35.2 |
| 2010/0081737 A1 * | 4/2010 | Bastioli et al. ................ 524/47 |

FOREIGN PATENT DOCUMENTS

| WO | 98/20073 | 5/1998 |
| WO | 0012616 A1 | 3/2000 |
| WO | 0017270 A1 | 3/2000 |

OTHER PUBLICATIONS

Office Action issued in the Chinese application No. 200680014789.x citing patent publication No. CN 1242032.
D. Bikiaris et al. "LDPE/plasticized starch blends containing PE-g-MA copolymer as compatibilizer" Polymer Degradation and Stability 59: 287-291 (1998).
D. Bikiaris, C. Panayiotou, "LDPE/Starch Blends Compatibilized with PE-g-MA Copolymers" Journal of Applied Polymer Science 70: 1503-1521 (1998).
Shujun Wang, Jiugao Yu, Jinglin Yu, "Compatible thermoplastic starch/polyethylene blends by one-step reactive extrusion", Polym Int 54:279-285 (2005).
St-Pierre N., Favis B.D., Ramsay B.A., Ramsay J.A., Verhoogt H., "Processing and characterization of thermoplastic starch/polyethylene blends", Polymer 38(3): 647-655 (1997).

(Continued)

Primary Examiner — Liam J Heincer
(74) Attorney, Agent, or Firm — Quarles & Brady, LLP

(57) ABSTRACT

Disclosed herein is a composition of matter comprising a blend of discontinuous thermoplastic starch domains in a synthetic polymer, said composition of matter being characterized by an average diameter of thermoplastic starch domains of about 0.2 to about 1.5 microns. Also disclosed are compositions of matter comprising a blend of discontinuous thermoplastic starch domains in a synthetic polymer and being characterized by finished articles having key mechanical properties which are essentially maintained or in some cases improved over pure synthetic polymers. In yet another aspect, the present invention provides a method for making the material of the present invention. In a related aspect, the present invention provides the novel materials issued from the method of making the material. In other aspects, the present invention provides novel finished article compositions in the form of films or molded articles.

13 Claims, 13 Drawing Sheets

(56) References Cited

OTHER PUBLICATIONS

F.J. Rodriguez-Gonzalez et al., "High performance LDPE/thermoplastic starch blends: a sustainable alternative to pure polyethylene", Polymer 44: 1517-1526 (2003).

F.J. Rodriguez-Gonzalez et al."Influence of Melt Drawing on the Morphology of One and Two-Step Processed ( . . . )", Advances in Polymer Tech. 22(4):297-305 (2003).

Yi-Jun Sun et al., "In situ compatibilization of polypropylene and poly(butylene terephthalate) polymer blends by one-step reactive extrusion", Polymer 37: 4119-4127 (1996).

P. Matzinos et al., "Processing and characterization of LDPE/starch product", Journal of Applied Polymer Science, vo. 79, 2548-2557 (2001).

P. Matzinos et al., "Processing and characterization of LDPE/starch/PCL blends", European Polymer Journal 38 (2002) 1713-1720.

P. Matzinos et al., "Procession and characterization of starch/polycaprolactone product", Polymer Degradation and Statibily 77 (2002) 17-24.

Chang-Hyeon Kim et al., "Reactive blends of gelatinized starch and polycarprolactone-g-glycidyl methacrylate", Jounal of Applied Polymer Science, vo. 81, 1507-1516 (2001).

European Patent Office, Extented European Search Report, Application No. 06741440.9, Nov. 11, 2011.

\* cited by examiner

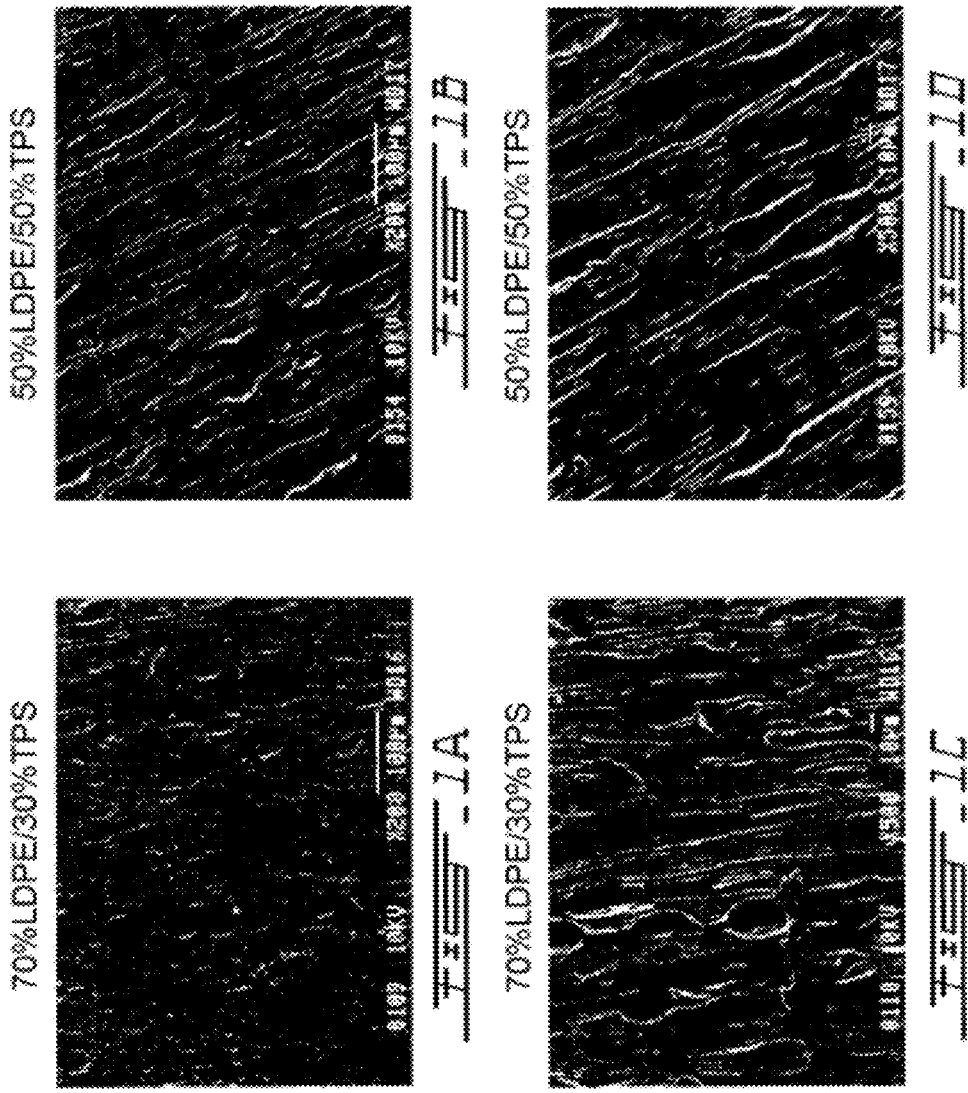

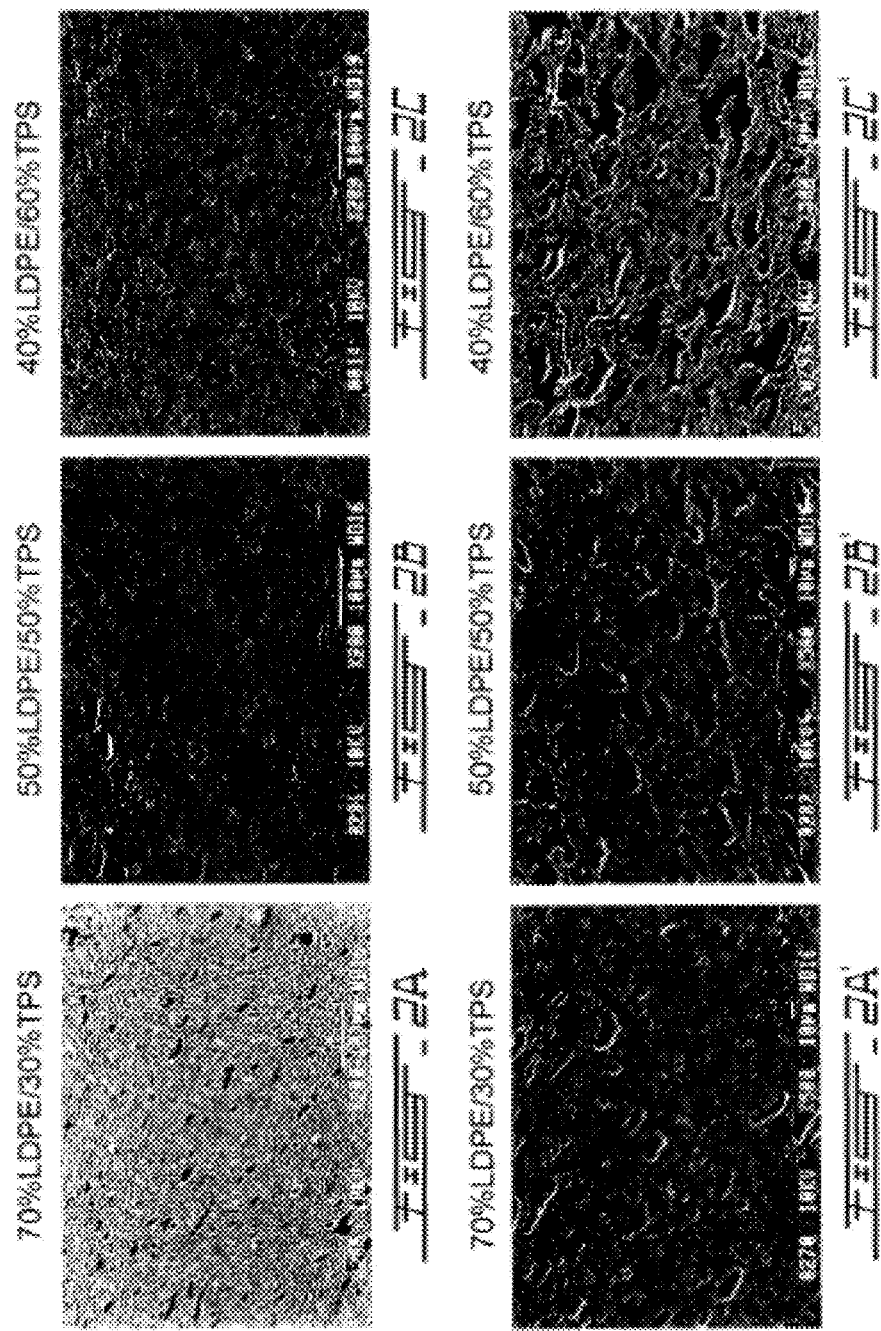

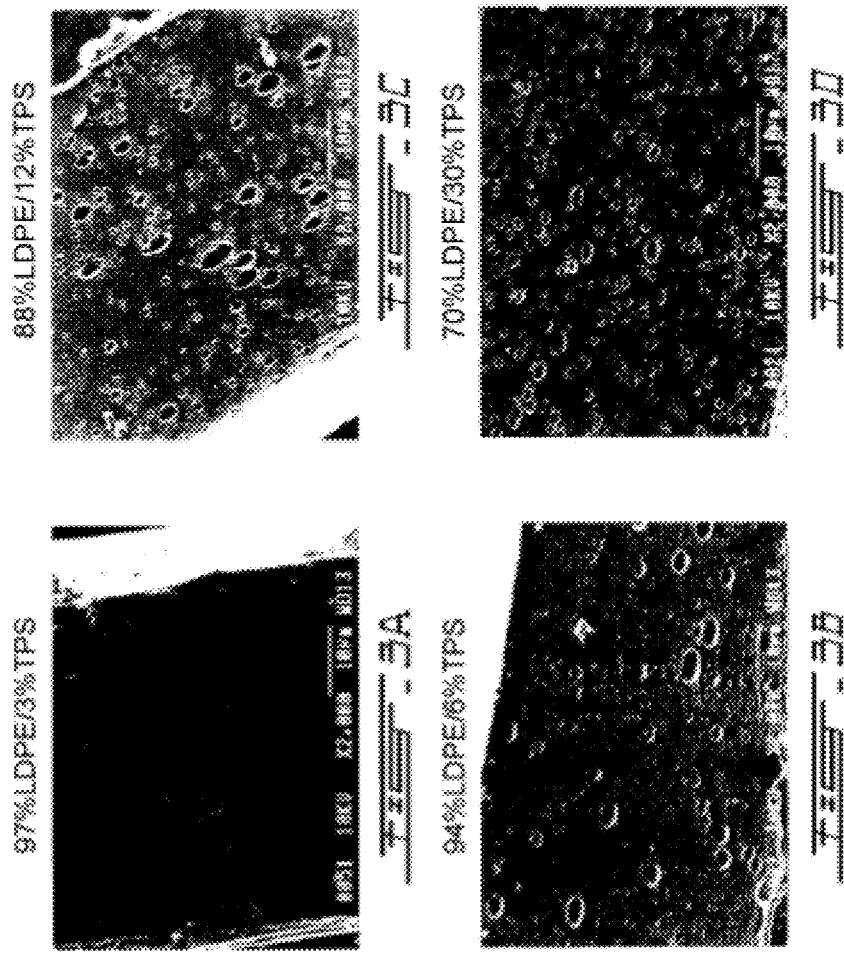

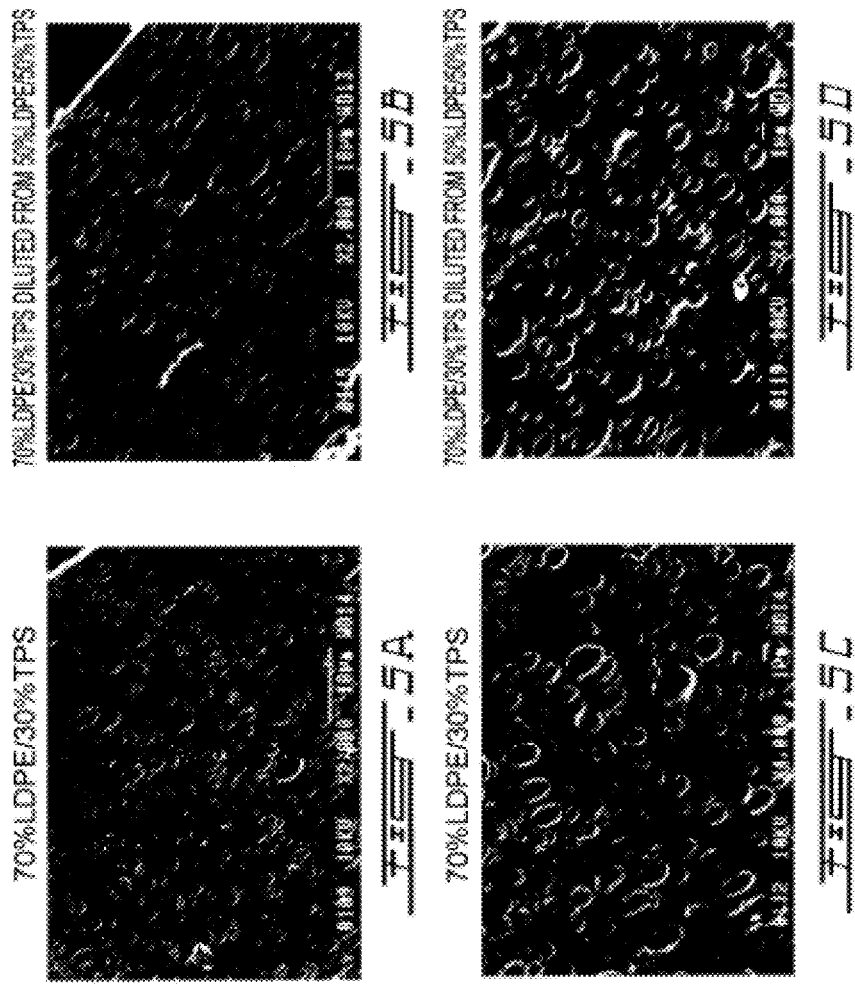

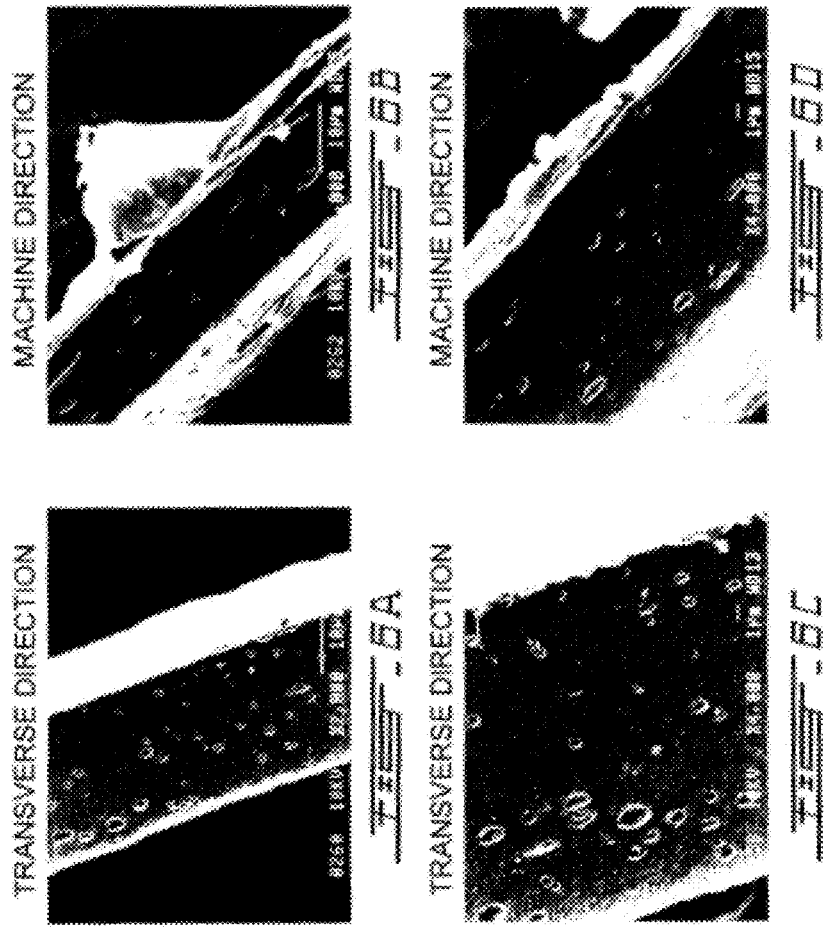

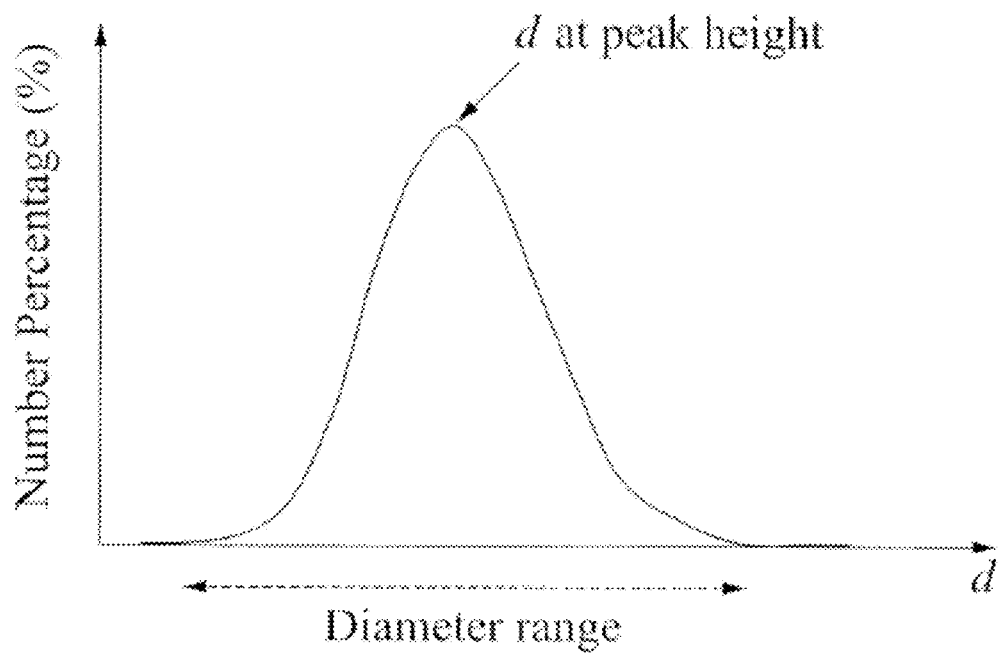

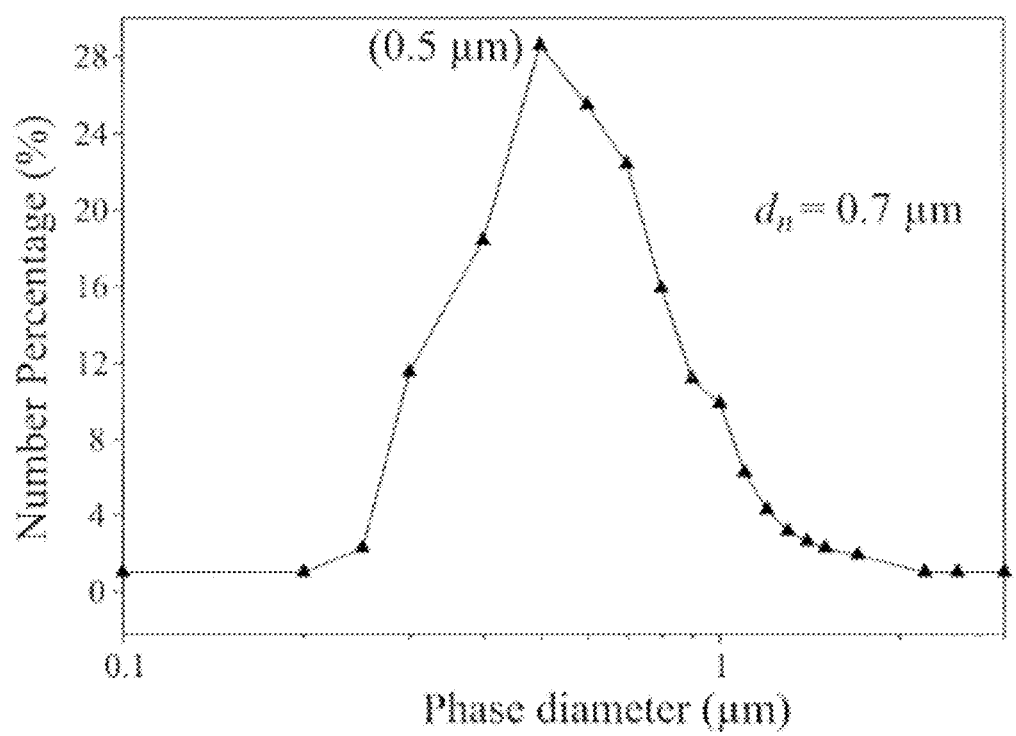

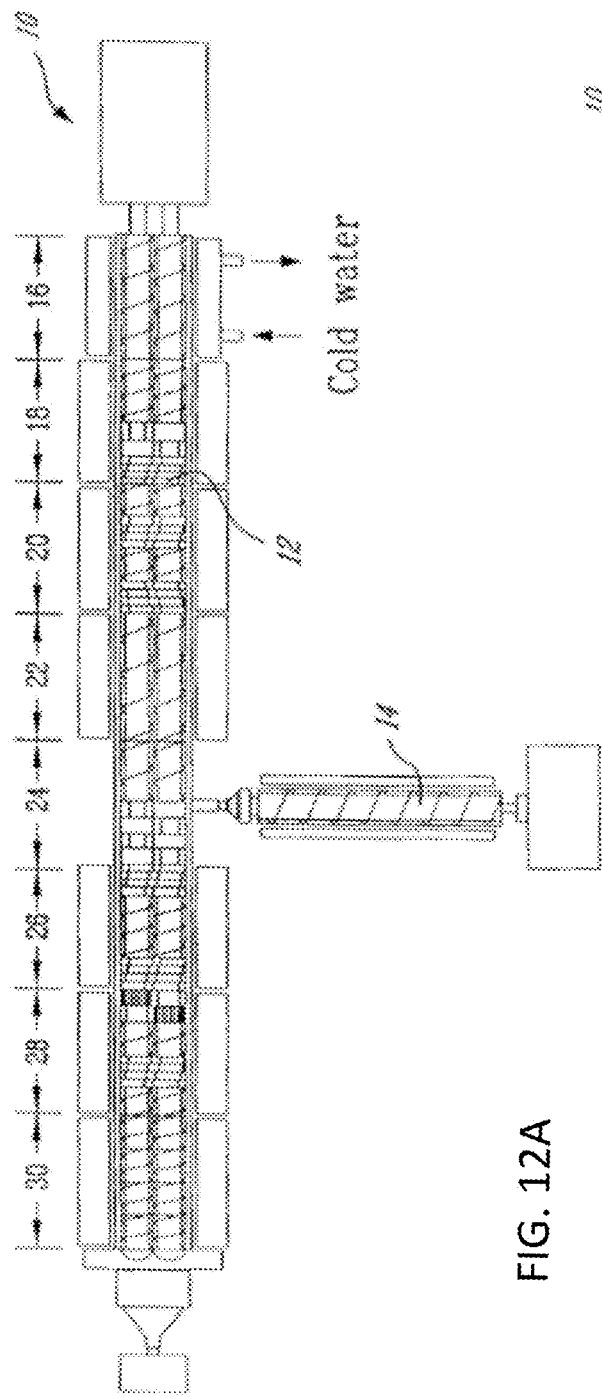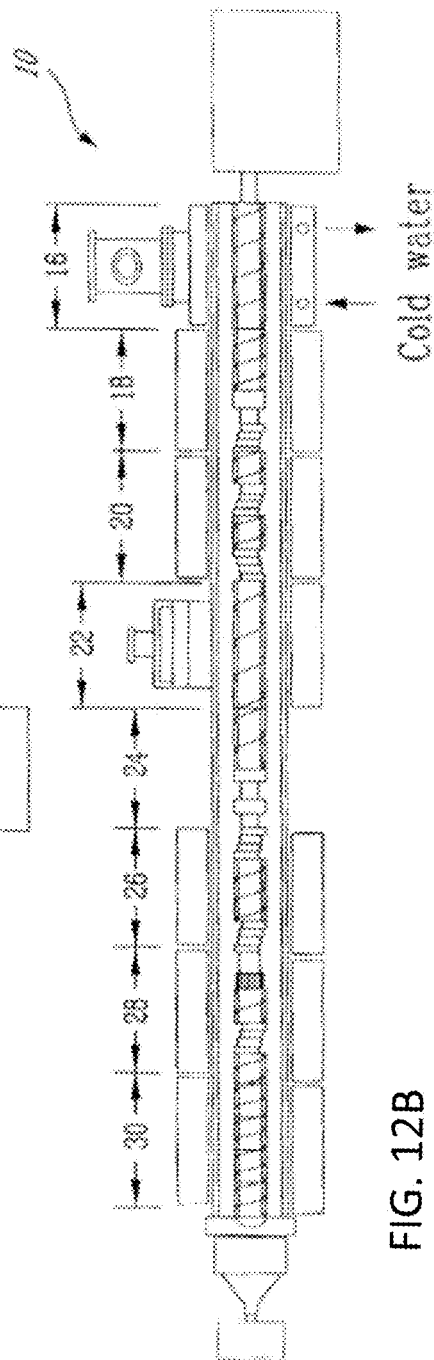
FIG. 12A
FIG. 12B

FIGURE 13A-D

THERMOPLASTIC STARCH AND SYNTHETIC POLYMER BLENDS AND METHOD OF MAKING

CROSS REFERENCE TO RELATED APPLICATIONS

This application represents the national stage application of International Application PCT/CA2006/000695, filed 28 Apr. 2006, which claims the benefit of U.S. Provisional Patent Application 60/675,913 filed 29 Apr. 2005, and U.S. Provisional Patent Application 60/691,772 filed 20 Jun. 2005, which are incorporated herein by reference in its entirety for all purposes.

FIELD OF THE INVENTION

The present invention relates to the field of blends of thermoplastic starch and synthetic polymers.

BACKGROUND OF THE INVENTION

Unlike dry, granular starch, thermoplastic starch (TPS) is capable of flow and hence polymer blending protocols can be applied to such a material. Starch is a polar, hence hydrophilic material.

Since starch is an inexpensive, renewable and biodegradable resource, blends of synthetic polymers and TPS represent a route towards ecologically and economically viable plastics.

However, synthetic polymers are known to be sensitive to TPS loading and their mechanical properties quickly suffer with the presence of TPS. It is therefore key to provide new materials and related methods which, despite TPS loading, maintain or even improve the mechanical properties of the end products when compared to pure (virgin) synthetic polymers.

As used herein, the term "starch" refers to any starch of natural origin whether processed, chemically modified or treated, including starches such as for example: wheat starch, corn starch, potato starch, and rice starch. Starch can also be derived from plant sources such as cassava, tapioca, and pea. It is a polysaccharide that consists essentially of a blend of amylose and amylopectin.

Starch includes modified starches, such as chemically treated and cross-linked starches, and starches in which the hydroxyl groups have been substituted with organic acids, to provide esters or with organic alcohols to provide ethers, with degrees of substitution in the range 0-3.

Starch also includes extended starches, such as those extended with proteins; for example with soya protein.

As used herein, the expression synthetic polymer refers to the materials listed below and mixtures thereof and includes any substantially non-polar hence water-insoluble or hydrophobic synthetic thermoplastic or thermoset material. Examples of substantially water-insoluble thermoplastic homopolymer resins are polyolefins, such as polyethylene (PE), polypropylene (PP), polyisobutylene; vinyl polymers, such as poly(vinyl chloride) (PVC), poly(vinyl acetate) (PVA), poly(vinyl carbazoles); polystyrenes; substantially water-insoluble polyacrylates or polymethacrylates, such as poly(acrylic acid) esters, poly(methacrylic acid) esters; polyacetals (POM); polyamides, such as nylon6, nylon-6,6, aliphatic and aromatic polyamides; polyesters, such as poly (ethylene terephthalate) (PET), poly(butylene terephthalate) (PBT); polyarylethers; polyurethanes, polycarbonates, polyimides, and high molar mass, substantially water-insoluble or crystallizable poly(alkylene oxides), such as poly(ethylene oxide), poly(propylene oxide).

Further included are polyesters and polylactides that are considered biodegradable in short time periods. Examples of those water insoluble materials are polylactones such as poly (epsilon-caprolactone) and copolymers of epsilon-caprolactone with isocyanates; bacterial poly(hydroxyalkanoates) such as poly(hydroxybutyrate-3-hydroxyvalerate); and polylactides such as poly(lactic acid), poly(glycolic acid) and copolymers comprising the repetitive units of both.

Further included are substantially water-insoluble thermoplastic α-olefin copolymers. Examples of such copolymers are alkylene/vinyl ester-copolymers such as ethylene/vinyl acetate-copolymers (EVA), ethylene/vinyl alcohol-copolymers (EVAL); alkylene/acrylate or methacrylate-copolymers preferably ethylene/acrylic acid-copolymers (EAA), ethylene/ethyl acrylate-copolymers (EEA), ethylene/methyl acrylate-copolymers (EMA).

Further included are styrenic copolymers, which comprise random, block, graft or core-shell architectures. Examples of such styrenic copolymers are α-olefin/styrene-copolymers preferably hydrogenated and non-hydrogenated styrene/ethylene-butylene/styrene copolymers (SEBS), styrene/ethylene-butadiene copolymers (SEB); styrene acrylonitrile copolymers (SAN), acrylonitrile/butadiene/styrene copolymers (ABS).

Further included are other copolymers such as acrylic acid ester/acrylonitrile copolymers, acrylamide/acrylonitrile copolymers, block copolymers of amide-esters, block copolymers of urethane-ethers, block copolymers of urethane-esters.

Further included are thermoset resins such as epoxy, polyurethane and polyesters.

It is known to prepare immiscible blends of TPS and polyolefin materials. Since one material is hydrophobic while the other is hydrophilic, the materials tend to form distinct domains or "islands". Large islands are not desirable in most applications since these regions do not have the mechanical properties of the polyolefin.

U.S. Pat. No. 6,605,657 (U.S. Pat. No. '657) teaches making a blend of TPS and a polyolefin, such as polyethylene. The disclosure of U.S. Pat. No. '657 is incorporated herein by reference thereto. The materials obtained in accordance with U.S. Pat. No. '657 typically contain from 50 to 60 weight percent of TPS and yet maintain good mechanical properties.

Description of the Method of Preparing the Novel Compositions

The method of the present invention uses a starch suspension as a first feed material and a synthetic polymer as a second feed material. The synthetic polymer is preferably ground into granules for ease of melt processing through a screw-type blender-extruder.

Referring now to FIGS. 12 and 13, there is shown a preferred embodiment of the extrusion apparatus used to carry-out the method of the invention. Referring to FIG. 12a, an upper view of the extrusion system 10 shows a twin-screw extruder (TSE) 12 to which is attached a single-screw extruder (SSE) 14. In sharp contrast with the prior art, the thermoplastic starch (TPS) is prepared in the TSE 12 while the synthetic polymer, in this case low density polyethylene (LDPE), is melted in SSE 14. This method will be further described hereinbelow.

Preparation of the Starch Suspension

Wheat starch was mixed in different proportions with water and glycerol. During the starch extrusion, water is important to promote the gelatinization process. Once gelatinized, the glycerol plasticizes starch. In addition to plasticizing starch; glycerol decreases the viscosity of TPS. In the suspension, the starch content varied from 48 to 50% by weight. Water and glycerol were varied from 20% to 30% and from 32% to 19% by weight, respectively. The glycerol concentration was varied in order to achieve TPS of varying and controllable viscosities. The water content was modified to maintain a constant liquid/solid ratio of about 1:1 v/v. Three examples are reported in Table 10 below. All contents are expressed in terms of %/wt of suspension.

TABLE 10

| Example | Starch content* | Glycerol content* | Water content* |
| --- | --- | --- | --- |
| 1 | 48 | 32 | 20 |
| 2 | 48.5 | 27.5 | 24 |
| 3 | 50 | 20 | 30 |

*In the initial slurry

In a typical suspension, 640 g of glycerol was mixed with 400 g of distilled water and placed in a recipient. 960 g of starch powder was poured in the recipient containing water and glycerol and stirred to give a homogeneous slurry. The slurry, once made, was used immediately in the preparation of LDPE/TPS blends. Starch suspensions are susceptible to the problem of sedimentation. Furthermore, the viscosity of the starch suspension increases with time. This increase has been attributed to the solvation of starch molecules and further re-arrangement into a gel-like structure. For these reasons the starch suspension must be used as fresh as possible, especially if the viscosity affects the feeding rate.

Feeding the mixture to the extruder as a slurry is a novel approach to preparing these materials and ensures that the starch is fully destructurized and that the glycerol is well dispersed throughout the starch material. Both of those elements are necessary components to achieving blends with the high elongational properties achieved by the present invention.

One-Step Extrusion Process
a) Basic Setup

Blending was carried out in a one-step process. A single-screw extruder (SSE) 14 was connected to an intermediate zone of a co-rotating twin-screw extruder (TSE) 12 using a leak-proof adapter. The schematic representation of the upper and side views of the extrusion system are showed in FIGS. 12 and 13, respectively. This one-step approach allows for the melt-melt mixing of the components which improves the morphology control of the dispersed TPS phase. It also provides the possibility of minimizing the contact time between the two polymers at high temperature which is the principal parameter for controlling the thermal degradation of TPS. The single screw used was from C.W. Brabender Instruments (L/D=26, length=495 mm, and compression ratio=2). The twin-screw was a Leistritz AG (LM 30.34), L/D=28, and length=960 mm. The above described setup allows for the separation of the different processes occurring in this operation. Accordingly, the melting of LDPE takes place in SSE 14, while both the starch gelatinization and plasticization (SGP) and melt blending occur in TSE 12. The mixing of TPS and PE occurs in the latter half of TSE 12. For ease of description, TSE 12 is pictorially divided into zones 16 to 30 as the blending progresses.

b) TPS Preparation

An important feature of the present method is the preparation of the TPS which comprises the steps of starch gelatinization and plasticization (SGP). The screw configuration in TSE 12 was chosen to give a long enough residence time, which permits SGP in the first zones of TSE 12. SGP took place over three sub-sections of TSE 12: feeding section 16, SGP sections 18 and 20 and water extraction section 22. The starch suspension was fed at a temperature lower than 25° C. in the first section of TSE 12. This zone was water-cooled in order to maintain a low temperature. SGP was carried out in the sections 18 and 20 of the TSE 12. Due to the thermal instability of starch, SGP was carried out at 70° and 90° C. in the sections 18 and 20, respectively. Several kneading sections were used to homogenize the resulting TPS. Back-flow kneading elements were also adapted to increase the residence time and, consequently, ensure the complete destructuring and the homogeneity of the TPS. It also served to increase the extrusion pressure before the venting zone 22. Water extraction took place in section 22 of TSE 12. Low-pressure elements, a higher temperature (110° C.) and vacuum were found to improve the water extraction. The venting zone 22 was connected to a condensation system, which avoided the passage of volatiles through the vacuum line. Once the TPS is substantially water-free, it can be blended with the second polymer, in this case LDPE.

The flow rate of the extruded TPS had an influence on the pressure exerted by the starch and its final appearance. In order to study this phenomenon, an TSE extruder configuration using just five zones was used. This configuration was similar to the original eight zones configuration, but zones 24, 26, 28 and 30 were taken out. Three capillary dies were used to measure the viscosity of TPS. The flow rate of the starch suspension was compared to that of TPS at the exit of the capillary die. Surprisingly, the difference between both flow rates was almost equal to the water content in the starch suspension. Likewise, TGA measurements indicated that the water content in TPS was around 1%. This approach is thus very effective in removing the water from thermoplastic starch. This is a critical point since excess water gives rise to bubbles in the resulting starch/polymer blend. These bubbles not only affect aesthetics but also diminish the mechanical properties of the blend. As such, TPS will be considered as a binary system composed of starch and glycerol.

In studying the effect of flow rate of the starch suspension on the quality of the extrudate, lower and upper limits of feeding were found. The lower limit was imposed by the increased residence time of the TPS. It is well known that the TSE works better under starve-fed conditions. In such a situation, the residence time is controlled by the screw configuration, the flow rate and the screw speed. The screw speed was maintained constant at 150-rpm in the whole series of melt mixing and viscosity measurement experiments. Evidence of degradation was found at flow rates of the extruded TPS lower than 20 g/min. The appearance of TPS changed from a transparent and flexible material to a yellowish more rigid one. When the flow rate of TPS was lower than the mentioned limit, an unexpected increase in the pressure was also monitored. At higher flow rates, the pressure was proportional to the measured flow rate. The upper limit for the flow rate of TPS was imposed by the water extraction in the venting zone 22. Problems of foaming were observed at flow rates between 45-50 g/min of TPS. In contrast to the lower limit, the pressure exerted by the foamed TPS decreased as the flow rate increased. Both phenomena were produced by the presence of water in the extrudate. Water vapor, at 150° C. was responsible for the foaming of TPS. Moreover, water excess reduced the viscosity of TPS in the extruder. This upper limit can be overcome by the addition of another venting zone or the modification of the existing one with more efficient equipment. As is mentioned above, the flow rate, temperature, and screw design are important parameters to control.

c) Mixing

The blend mixing section can be divided into three sub-sections: LDPE addition zone 24 mixing zone 26 and 28 and pumping zone 30. The temperature of the whole mixing section was maintained constant at 150° C. As observed in FIG. 12a, the LDPE addition zone 24 has no heating element, however, the temperature was maintained around 150° C. by the convection heating of the neighboring zones 14 and 26 and the molten LDPE. The melt mixing of LDPE and TPS starts in zone 24. The melt mixing continued through the next two zones 26 and 28 aided by several kneading and mixing elements. The pumping zone 30 is necessary to pressurize the extrudate through the die head.

The proportion of thermoplastic starch in terms of wt % of the resulting TPS/polymer blend was about 10 to 60 wt %, and preferably about 20 to 55 wt %.

It is to be noted that by attaching the single-screw extruder 14 progressively downstream (zones 26, 28 or 30) on the twin-screw 12 it is possible to achieve the same level of morphology control as reported here at very low blend residence times. Thus, one of the advantages of the single step approach is that it can be used to minimize the residence time of starch in contact with a high melting polymer. Therefore, TPS can be blended with high melting temperature polymers such as PP, PS, PET etc. while still minimizing thermal degradation of the starch.

The die head 32 and SSE 14 were operated at the same temperature as the mixing section. The screw speed of SSE 14 was kept constant using an arbitrary measure of the motor speed (2.5) and the flow rate of LDPE was controlled with the aid of a pellet feeder. Maximum pumping of SSE 14 under these conditions was 100 g/min.

d) Sheet Take-Up

LDPE/TPS blends were extruded through a rectangular die. Blends were quenched using calendar rolls. Calendar rolls were used because blends could not be quenched in cold water due to the highly hydrophilic nature of TPS. The strain ratio, the ratio between the speed of extrudate and the speed of the ribbon at the exit of the calendar, was around 2. That imposed a machine direction deformation on the ribbon. The morphology of those blends showed evidence of that deformation.

U.S. Pat. No. '657 teaches a one-step extrusion process to obtain a material having a highly continuous TPS phase or even a fully co-continuous blend of TPS and polyolefins while maintaining satisfactory mechanical properties. In general terms, a starch suspension is prepared using predetermined ratios of starch, water and a plasticizer such as glycerol. The extrusion system is composed of a single-screw extruder connected to a twin-screw extruder. The twin-screw extruder is divided into two parts. The first part is used to gelatinize and plasticize the starch suspension. The second part is used to vent-off the volatiles including water-vapor and receive input from the single-screw extruder fed with molten synthetic polymer. The resulting blend contains TPS and synthetic polymer, is essentially water-free and may be further processed using conventional equipment. The detailed method of making in the disclosure portion of U.S. Pat. No. 6,605,657 is incorporated herein by reference.

The material produced in accordance with U.S. Pat. No. 6,605,657 may be conveniently granulated and cooled in the form of pellets for later use as per the present invention. However, the material produced in accordance with U.S. Pat. No. '657 may also remain molten for direct processing and use as per the present invention.

It was heretofore thought that TPS was simply useful to provide more ecologically viable and less expensive polymer blends. However, it was heretofore neither predictable nor predicted that TPS-containing materials processed in the manner of the present invention could actually become new materials by virtue of physico-chemical modifications and, as new materials, essentially maintain or even improve key mechanical properties over non TPS-containing materials.

SUMMARY OF THE INVENTION

It has now been found that materials made in accordance with the teachings of U.S. Pat. No. 6,605,657 may be diluted by melt-processing with further amounts of synthetic polymers to provide materials having excellent properties for applications such as film articles production and injection molding.

It has also been found that materials made in accordance with the teachings of U.S. Pat. No. '657 may be reprocessed by melt-processing (without the need for dilution with further amounts of synthetic polymer) to provide materials having excellent properties for applications such as film articles production and injection molding.

Surprisingly, it has been observed that reprocessing with or without dilution in synthetic polymers exerts physico-chemical changes on the material having the observable effect of fragmenting existing elongated TPS domains into a plurality of much smaller TPS domains. This may explain the surprising effects on the final properties of the compositions of the present invention.

In one aspect, the present invention provides TPS-containing synthetic polymer blends wherein the TPS domains exhibit discontinuous TPS domains in relation to other TPS domains.

As used herein, the term "discontinuous" refers to a feature where less than 50% of the starch domains are extractable. The per-cent extractable TPS is based on the weight loss of TPS from a 1 mm long (machine-direction) by 7.5 mm wide (cross-direction) specimen subjected to hydrolytic degradation in a solution of HCl at 60° C. for 96-150 hours. Extracted samples are vigorously washed with distilled water and dried at 60° C. in a vacuum oven for 48 hours prior to weight measurement.

"Discontinuous" TPS domains are in contrast to the "co-continuous" or "highly continuous" TPS domains defined in U.S. Pat. No. '657.

Indeed U.S. Pat. No. '657 defined "continuous" as referring to either the TPS or the polymer phases being essentially constituted of a network of interconnected domains. The term "co-continuous" was defined as a composition wherein both the TPS and the polymer phase were continuous. Finally, the expression "highly continuous TPS phase" was defined as a composition where the TPS phase was dispersed in the polymer phase and wherein the TPS domains were nearly all interconnected. "Highly continuous" was further defined as the case in which 50% or more of the dispersed TPS was extractable using the same testing protocol defined above.

In the present invention, the discontinuous TPS domains were preferably found to have a small average domain size diameter of about 0.2 to 1.5 microns.

It has been found that by virtue of further melt reprocessing of the material described in U.S. Pat. No. '657, with and without dilution with synthetic polymers, new and useful materials are created. In these novel materials, the creation of a plurality of discontinuous TPS domains were shown to be beneficial to retention or improvement of the final properties of the articles.

The discontinuous TPS domains are preferably small TPS domains, in the order of about 0.2 to 1.5 microns. This essentially maintains and in many cases actually improves the mechanical properties of film and molded products when compared to pure synthetic polymers or blends thereof. Examples of improved properties are tear strength, dart impact strength for films and notched and unnotched impact strength for molded products, measured according to standard protocols referred to below.

When used herein, the expression "essentially maintains" refers to situations where at least 40%, preferably 60% and most preferably 80% or more, of some key properties of the final product were shown to be maintained when compared to pure (virgin) synthetic polymers.

In yet another aspect, the present invention provides a method for making the material of the present invention.

In a related aspect, the present invention provides the novel materials issued from the method of making the material.

In other aspects, the present invention provides novel finished article compositions in the form of films or molded articles.

Thus, in one aspect, the invention provides a composition of matter comprising a blend of discontinuous thermoplastic starch domains in a synthetic polymer, said composition of matter being characterized by an average diameter of thermoplastic starch domains of about 0.2 to about 1.5 microns.

In another aspect, the invention provides a composition of matter in the form of a film article comprising a blend of discontinuous thermoplastic starch domains in a synthetic polymer, said article being characterized by a dart test limit and/or tear strength limit essentially maintained or improved (maintained at 40%, preferably 60% and most preferably 80% or more) over unblended pure synthetic polymer processed and tested in the same way.

In another aspect, the invention provides a composition of matter in the form of a molded article comprising a blend of discontinuous thermoplastic starch domains in a synthetic polymer, said article being characterized by an impact strength test performance essentially maintained or improved (maintained at 40%, preferably 60% and most preferably 80% or more) over unblended pure synthetic polymer processed and tested in the same way.

The compositions of matter according to the above with preferably contain the thermoplastic starch in a proportion of 0.1 wt % to about 40 wt %, preferably 10 wt % to 30 wt %, and most preferably 15 wt % to 25 wt % based on the total weight of the composition.

The method of the present invention for making a blend of thermoplastic starch and synthetic polymer, will generally comprise the steps of:
(a) providing a starch suspension comprising starch, water and a plasticizer, preferably glycerol;
(b) obtaining a thermoplastic starch from the starch suspension by causing gelatinization and plasticization of said starch suspension by exerting heat and pressure on said starch suspension in a first extrusion unit;
(c) evaporating and venting off residual water from the thermoplastic starch to obtain a substantially moisture-free thermoplastic starch;
(d) obtaining a melt of a synthetic polymer or synthetic polymer blend in a second extrusion unit;
(e) combining the melt obtained from step (d) with the substantially moisture-free thermoplastic starch;
(f) diluting in molten state the material obtained in step (e) with a synthetic polymer or synthetic polymer blend;
(g) recovering the material of step (f).

The method can also further comprise between steps (e) and (f) the step of cooling and granulating the material of step (e).

DESCRIPTION OF THE DRAWINGS

FIGS. 1a-1d are scanning electron micrographs (SEM) images of cooled and solidified blends of starting materials made in accordance with U.S. Pat. No. 6,605,657, showing machine direction views.

FIGS. 2a, 2a', 2b, 2b', 2c and 2c' are SEMs of the materials of FIGS. 1a-1d as well as 40% LDPE/60% TPS, shown in cross direction.

FIGS. 3a-3d are SEMs of materials made in accordance with the present invention at various dilutions of TPS. The SEM show cross direction morphology of different LDPE/TPS film samples:
  a. 97% LDPE/3% TPS  c. 88% LDPE/12% TPS
  b. 94% LDPE/6% TPS  d. 70% LDPE/30% TPS

FIGS. 5a-5d show the same materials as FIGS. 4a-4d but in the machine direction.

FIG. 6 shows the film morphology of 90/10 LLDPE/TPS diluted with superhex LLDPE from 50/50 LLDPE/TPS.

FIGS. 8-11 show the domain size distribution calculation and results for materials prepared in accordance with the present invention.

DESCRIPTION OF ILLUSTRATIVE EMBODIMENTS

Figure 4A:
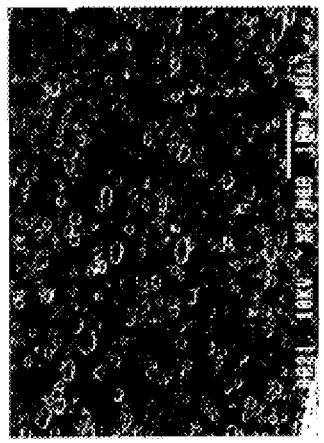
FIGS. 4a-4d are SEMs of materials made in accordance with the present invention for undiluted 70% LDPE/30% TPS and for 70% LDPE/30% TPS diluted from 50% LDPE/50% TPS. The SEMs show cross direction morphology of different LDPE/TPS film samples.
Figure 4B:
Figure 4C:
Figure 4D:

Pellets were prepared in accordance with the process disclosed in U.S. Pat. No. 6,605,657 using various synthetic polymers including Low Density Polyethylene (LDPE), Linear Low Density Polyethylene (LLDPE) and High Density Polyethylene (HDPE). These pellets were molten, diluted and blended with additional synthetic polymers.

As used herein when referring to immiscible TPS/polymer compositions, the term "continuous" refers to either the TPS or the polymer phase being essentially constituted of a network of interconnected domains. The term "co-continuous" refers to a composition wherein both the TPS and the polymer phase are continuous. The expression "highly continuous TPS phase" refers to a composition where the TPS phase is dispersed in the polymer phase and wherein the TPS domains are nearly all interconnected. Highly continuous can be defined as the case in which 50% or more of the dispersed TPS is extractable. The per-cent extractable TPS is based on the weight loss of TPS from a 1 mm long (machine-direction) by 7.5 mm wide (cross-direction) specimen subjected to hydrolytic degradation in a solution of HCl at 60° C. for 96-150 hours. Extracted samples were vigorously washed with distilled water and dried at 60° C. in a vacuum oven for 48 hours prior to weight measurement. The concept of continuity of the TPS phase is of particular importance when measuring the biodegradability of a material. If the TPS phase is not continuous or highly continuous, the TPS domains will be encapsulated by a non-degradable polymer rendering them substantially less accessible to biodegradation.

As used herein, the term "plasticizer" refers to any suitable plasticizer for producing a TPS. Plasticizers include for example: adipic acid derivatives, such as tridecyl adipate; benzoic acid derivatives, such as isodecyl benzoate; citric acid derivatives, such as tributyl citrate; glycerol itself and derivatives; phosphoric acid derivatives, such as tributyl phosphate; polyesters; sebacic acid derivatives, such as dimethyl sebacate; urea.

The plasticizer can advantageously be selected from the group consisting of glycerin, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neopentyl glycol, trimethylol propane, pentaerythritol, sorbitol, and the sorbitol acetate, ethoxylate, and propoxylate derivatives thereof.

Moreover, the plasticizer can also be selected from the group consisting of sorbitol ethoxylate, glycerol ethoxylate, pentaerythritol ethoxylate, sorbitol acetate, and pentaerythritol acetate.

The materials thus obtained were then examined under Jeol JSM 840 Scanning electron microscope (SEM) at 10 to 15 kV. Smooth surfaces of all samples were prepared for SEM using a microtome (Leica-Jung RM2165) equipped with a glass knife. Extraction of the TPS phase was performed with HCl 6N and a coating of gold-palladium alloy was applied.

As a comparative, undiluted pellets were processed in the same manner.

Referring to FIGS. 1a-d, machine direction views of highly continuous morphologies in 70LDPE/30TPS and 50LDPE/50TPS, ratios being expressed on weight.

Referring to FIGS. 2a-a'-b-b'-c-c' show cross sections of prepared pellets in accordance with U.S. Pat. No. 6,605,657 but this time in the cross direction. In greater detail, the pellets were prepared with the following ratios of PE/TPS: a & a': 70% LDPE/30% TPS; b & b': 50% LDPE/50% TPS c & c': 40% LDPE/60% TPS.

FIGS. 12A-B show upper views of the extrusion system 19 with a twin-screw extruder (TSE) 12 to which is attached a single-screw extruder (SSE) 14.

FIGS. 13A-D show SEMS images of materials from the extrusion system 19.

I) Film Products

In accordance with the method of the present invention, samples of pellets obtained as described above were melted at 160° C. and diluted with melted PE at various ratios and processed as blown films using conventional apparatus.

FIGS. 3a to 3c show diluted product at various ratios. FIG. 3d shows the undiluted product.

It has now been found that undiluted or diluted mixtures referred to above, once processed as a film, exhibit and retain very small TPS domains and excellent mechanical properties. FIGS. 4, 5 and 6 show SEM of LDPE and LLDPE blends with TPS at various ratios. This shows that equivalent results are obtained with different synthetic polymers in the form of various polyolefins.

When measured, the average size of TPS domains was shown to be about 0.5 microns as shown in FIGS. 8-11.

Tables 1 to 5 below, show that, surprisingly, re-processing of the pellets obtained from U.S. Pat. No. 6,605,657 (with or without further dilution with synthetic polymer) provides a film product characterized by significant improvement in dart impact and/or tear strength and/or elongation at break over pure (virgin) LDPE and the maintenance of other properties at values similar or even superior to the pure LDPE or LLDPE.

All tests were carried out under ASTM norms. More specifically, for films: Dart Drop: ASTM D4272 and Elmendorf Tear Test: ASTM D1922.

List of symbols used in the Tables:
$\sigma_{max}$ Ultimate Tensile Strength
E Young's Modulus
$\epsilon_b$ Elongation at break

TABLE 1

(Blown film) - Tear and dart properties of different LDPE/TPS film samples

| Materials | Tear MD (g/μm) | Tear MD ratio[a] (%) | Tear TD (g/μm) | Tear TD ratio[a] (%) | Dart (g) | Dart ratio[a] (%) |
|---|---|---|---|---|---|---|
| LDPE | 5.0 ± 0.3 | 100 | 6.7 ± 0.6 | 100 | 99 | 100 |
| LDPE/TPS 94/06 diluted from 40/60 | 7.3 ± 0.5 | 146 | 7.9 ± 0.6 | 118 | 103.5 | 105 |
| LDPE/TPS 88/12 diluted from 40/60 | 6.3 ± 0.9 | 126 | 8.1 ± 0.7 | 121 | 116.8 | 118 |

[a]Relative values were determined as a function of virgin LDPE (M.I. = 2)

TABLE 2

(Blown film) - Tear and dart properties of 70 LDPE/30 TPS film samples (higher gauge film)

| Materials | Tear MD (mN) | Tear MD ratio[a] (%) | Tear TD (mN) | Tear TD ratio[a] (%) | Dart (g) | Dart ratio[a] (%) |
|---|---|---|---|---|---|---|
| LDPE | 3236 | 100 | 1885 | 100 | 158 | 100 |
| LDPE/TPS 70/30 | 2743 | 85 | 2008 | 107 | 130 | 82 |

[a]Relative values were determined as a function of virgin LDPE (M.I. = 2)

TABLE 3

(Blown film) - MD Tensile strength results for pure LDPE versus LDPE blended with TPS

| Materials | $\sigma_{max}$(MPa) | $\sigma_{max}/\sigma_{0max}$[a] | E (MPa) | $E/E_0$[a] | $\epsilon_b$ (%) | $\epsilon_b/\epsilon_{b0}$[a] |
|---|---|---|---|---|---|---|
| LDPE-MD | 20.7 ± 0.5 | 100.0 | 170.4 ± 6.0 | 100.0 | 417.0 ± 40 | 100.0 |
| LDPE/TPS 97/03 diluted from 40/60-MD | 19.4 ± 0.3 | 93.7 | 178.0 ± 5.2 | 104.5 | 427.5 ± 27 | 102.5 |
| LDPE/TPS 94/06 diluted from 40/60-MD | 18.8 ± 1.0 | 90.8 | 139.1 ± 2.5 | 81.6 | 550.0 ± 32 | 131.9 |
| LDPE/TPS 88/12 diluted from 40/60-MD | 17.2 ± 0.7 | 83.1 | 158.2 ± 9.8 | 92.8 | 571.4 ± 28 | 137.0 |

TABLE 4

(Blown film) - TD Tensile strength results for pure
LDPE versus LDPE blended with TPS

| Materials | $\sigma_{max}$(MPa) | $\sigma_{max}/\sigma_{0max}{}^a$ | E (MPa) | $E/E_0{}^a$ | $\epsilon_b$ (%) | $\epsilon_b/\epsilon_{b0}{}^a$ |
|---|---|---|---|---|---|---|
| LDPE-TD | 16.0 ± 0.6 | 100.0 | 201.8 ± 6.2 | 100.0 | 790.8 ± 85 | 100.0 |
| LDPE/TPS 97/03 diluted from 40/60-TD | 15.0 ± 0.5 | 93.8 | 204.8 ± 5.3 | 101.5 | 726.0 ± 65 | 91.8 |
| LDPE/TPS 94/06 diluted from 40/60-TD | 14.3 ± 0.6 | 89.4 | 200.3 ± 6.5 | 99.3 | 702.2 ± 29 | 88.8 |
| LDPE/TPS 88/12 diluted from 40/60-TD | 13.6 ± 0.4 | 85.0 | 197.7 ± 5.7 | 98.0 | 747.0 ± 69 | 94.5 |

$^a$Relative values were determined as a function of virgin LDPE

TABLE 5

(Blown film) - Film blowing results for diluted blend
Glycerol at 36% based on weight of TPS
Solid-Solid Dilution of Pellets of Resin 2 and Pellets of LLDPE
Resin 2: 50% LLDPE/50% TPS

|  | 25% Resin 2 + 75% LLDPE | Virgin LLDPE |
|---|---|---|
| Dartdrop Energy (ft lbf) | 3.23 | 1.77 |
| Tear MD (Grams/mil) | 452 | 461 |
| Tear TD (Grams/mil) | 568 | 587 |

FIG. 8 shows how TPS domain size distributions are calculated for the film materials made in accordance with the present invention.

Figure 10:
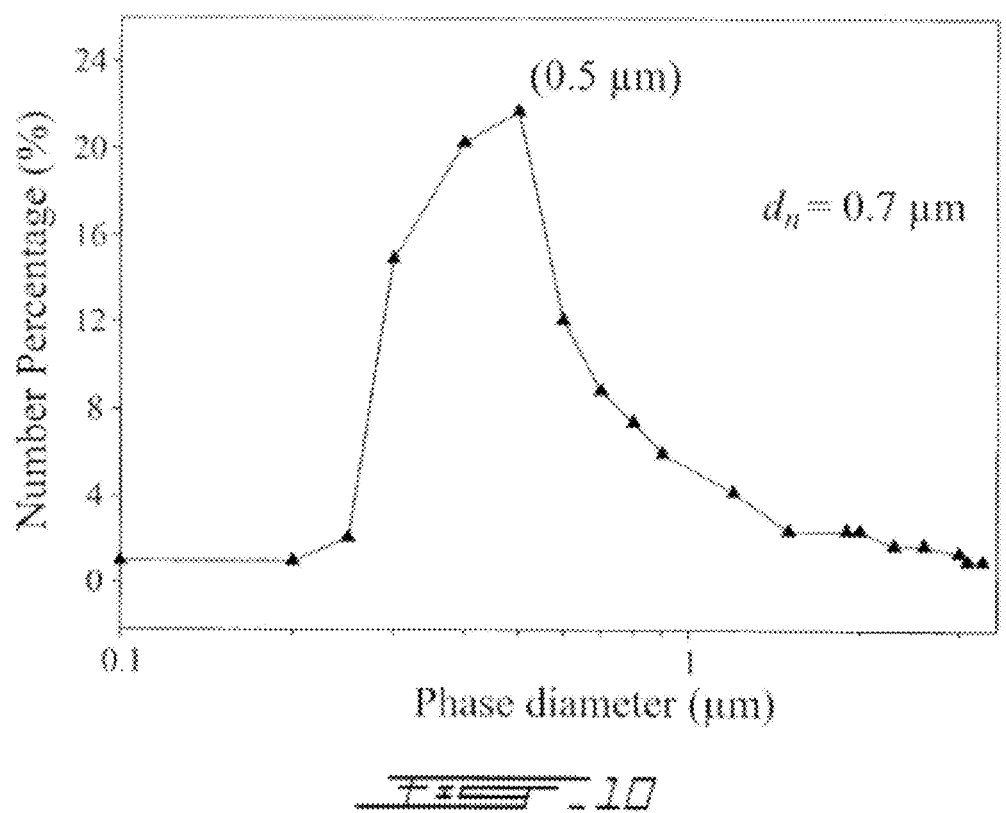
Figure 11:
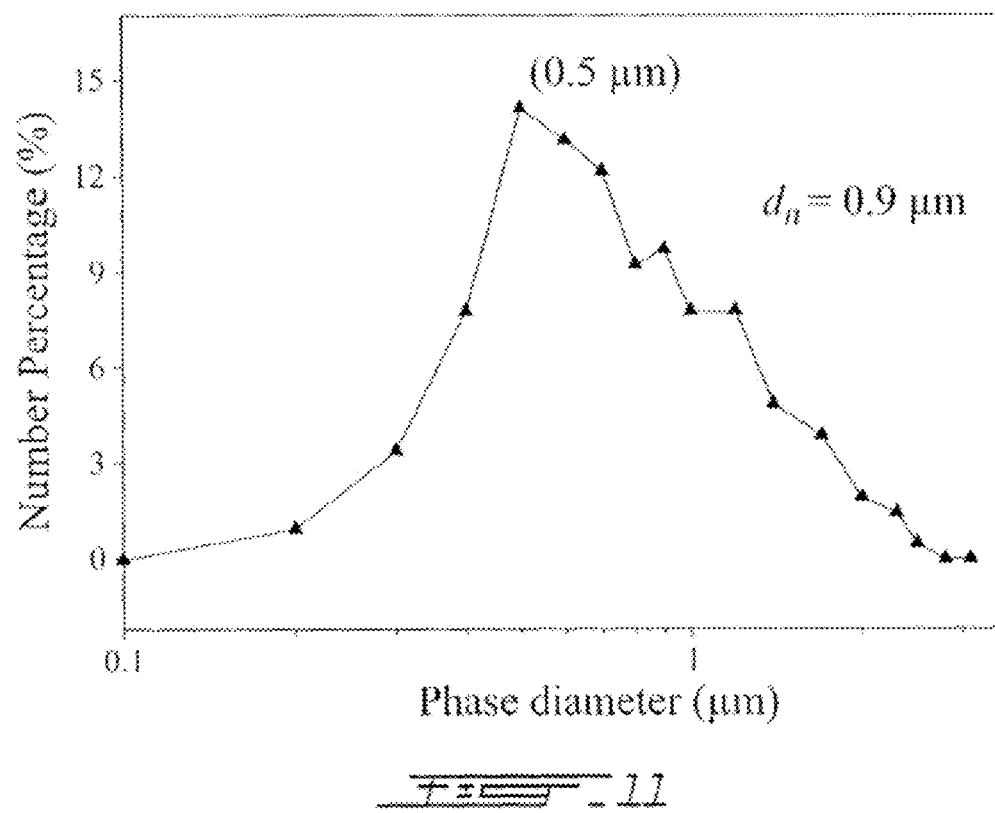
Figure 13A:
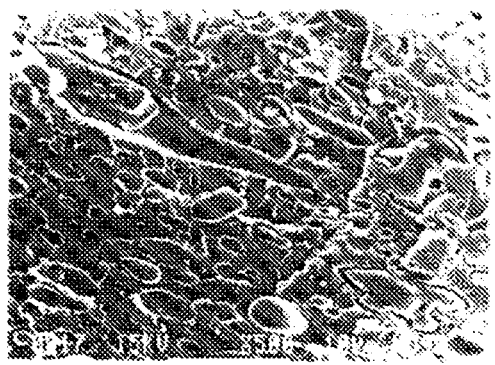
Figure 13B:
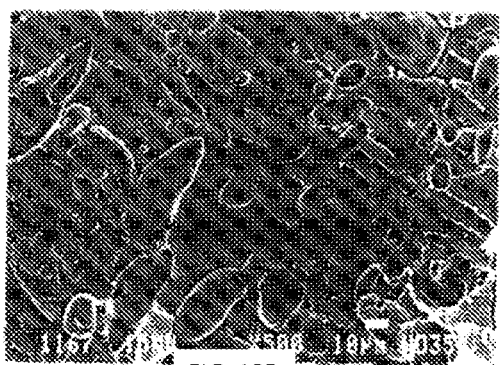
Figure 13C:
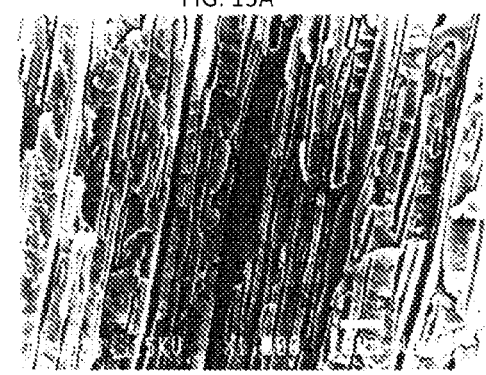
Figure 13D:
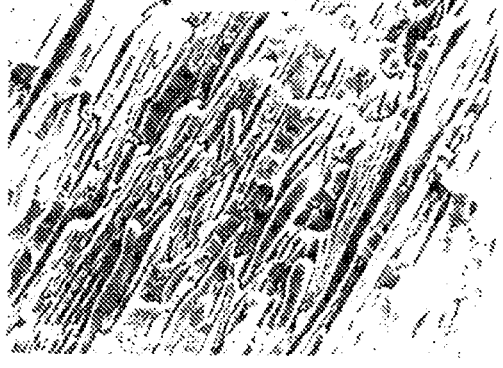

FIGS. 9 to 11 show domain size distributions for the film materials made in accordance with the present invention.

II) Molded Products (HDPE/TPS Blends)

All tests were carried out under ASTM or ISO norms. More specifically, for injection molded articles: Unnotched IZOD Impact Strength: ASTM D4812 and notched IZOD Impact Strength D256A.

Blends described above and having 70HDPE/30TPS weight ratios were also tested for performance in convention injection molding equipment. High density Polyethylene (HDPE) is known for high performance results in impact strength, modulus and low shrinkage coefficient upon cooling. These are of course desirable properties for injection molded articles. Table 6 below shows results obtained.

TABLE 6

Injection molded articles

|  | 70% HDPE/30% TPS (including 36% Glycerol based on weight of TPS) | Virgin HDPE (M.I. = 7) |
|---|---|---|
| Impact (Unnotched Charpy) | 0.257 | 0.129 |
| Flexural Modulus (MPa) | 551 | 535 |
| Shrinkage (coef.) | L 0.0214 | 0.0219 |
|  | W 0.0052 | 0.0122 |
|  | T 0.0007 | 0 |

It was surprisingly found that the injection molded articles prepared in accordance with the present invention possessed greater impact strength while maintaining other key properties. It was also found that Young's Modulus can be readily increased by reducing the glycerol content in the initial pellets made in accordance with U.S. Pat. No. 6,605,657.

Figure 7A:
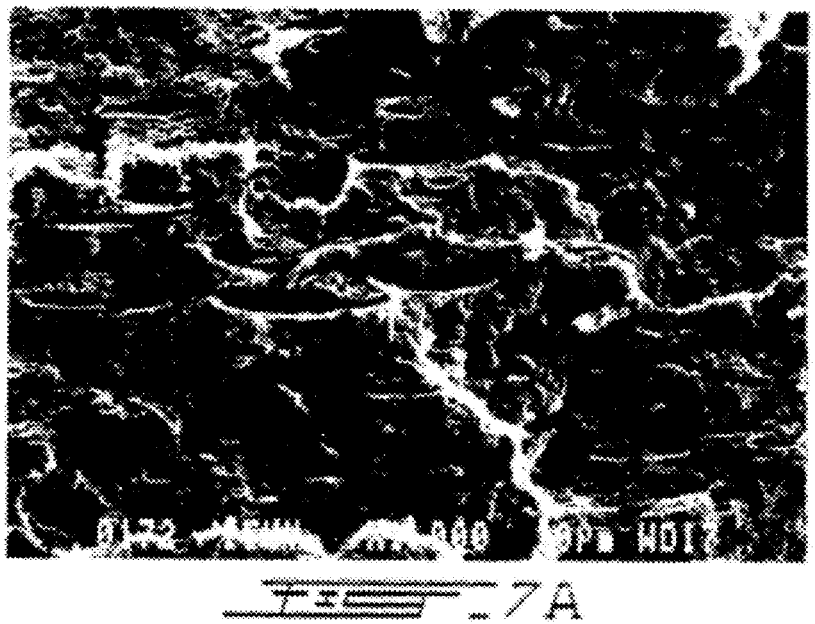
FIGS. 7a and 7b show a blend of 70/30 HDPE/TPS (36% glycerol) diluted to 85/15 HDPE/TPS (fractured injection molded dog-bones). View in 7a: flow direction, 7b: transverse to flow direction.
Figure 7B:
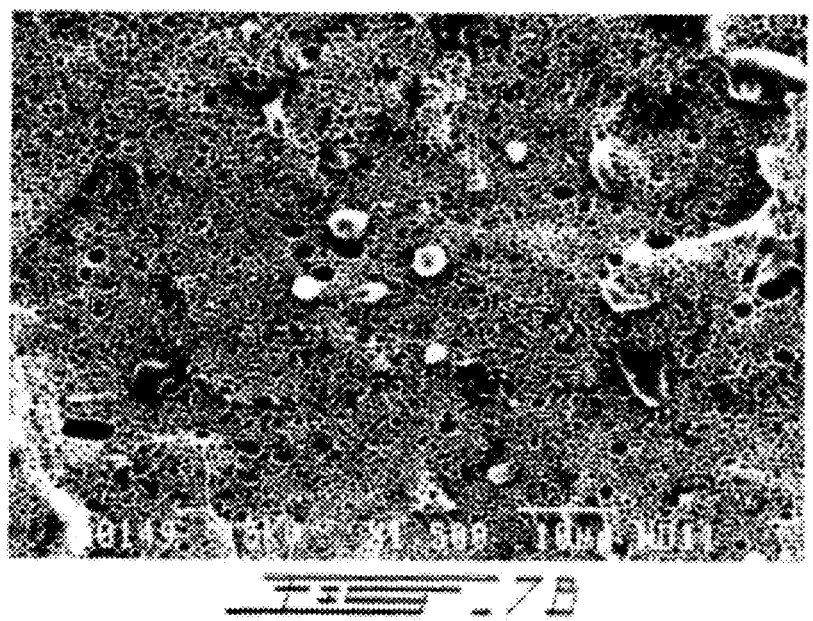

FIGS. 7a and 7b show a cross section of 70HDPE/30TPS (36% glycerol in TPS) diluted to 85HDPE/15TPS (fractured dog-bones). View in: 7a flow direction and 7b transverse to flow direction.

Table 7 shows Unnotched Izod Impact Strength results for various materials made in accordance with the present invention compared to pure (virgin) HDPE (M.I.=8).

TABLE 7

Unnotched impact test results
The test was carried out according to ASTM standard D-4812.

| Sample | Izod impact Unnotched Strength (J/m) |
|---|---|
| Virgin HDPE (M.I. = 8) | 1573.26 |
| 36% glycerol in TPS |  |
| 90HDPE/10TPS | 1670.81 |
| 80HDPE/20TPS | 1287.73 |
| 70HDPE/30TPS | 915.51 |
| 30% glycerol in TPS |  |
| 90HDPE/10TPS | 1853.39 |
| 80HDPE/20TPS | 1301.12 |
| 70HDPE/30TPS | 1003.87 |
| 24% glycerol in TPS |  |
| 90HDPE/10TPS | 1259.49 |
| 80HDPE/20TPS | 875.13 |
| 70HDPE/30TPS | 622.97 |

Table 8 shows Notched Izod Impact Strength results for various materials made in accordance with the present invention compared to pure (virgin) HDPE (M.I.=8).

TABLE 8

Notched impact test results
Impact test results for 75 HDPE/25 TPS blends

| Sample | Notched Izod impact Strength (J/m) (ASTM D 256A) |
|---|---|
| Virgin HDPE (MI = 17) | 48 |
| 40% glycerol in TPS | 49 |
| 36% glycerol in TPS | 47 |
| 32% glycerol in TPS | 42 |
| 28% glycerol in TPS | 34 |

The above results demonstrate that even when loaded with relatively large amounts of TPS, the final material essentially maintained its notched and unnotched Izod impact strengths. This is quite surprising since virgin synthetic polymers are normally known to be very sensitive to TPS loading and it was expected that such a property would fall to a much greater extent. Indeed, blends of polymers of such highly dissimilar molecular compositions are known to be very sensitive to dispersed phase loadings and it was expected that properties such as impact strength would fall to a much greater extent. For example, when 30% of poly(butylene terephthalate) is blended with 70% polypropylene, the impact strength of the blend is 2 Joules as compared to 24 Joules for the pure polypropylene and 20 Joules for the poly(butylene terephthalate). This is a typical example for highly dissimilar blend systems without interfacial modifier and represents a property retention of only 8% as compared to pure polypropylene (7).

III) Morphology Versus Prior Art

Table 9 below shows a comparative of average TPS domain size distributions for six (6) prior art references (shown as lines 1 to 6 and identified below Table 9) and the material made in accordance with the present invention (shown as line 7). It can be clearly seen that the average size distribution of the materials made in accordance with the present invention are much smaller than the materials characterized and reported in the prior art.

It has also been found that the size of the TPS domains may be adjusted at will by modifying the amount of glycerol or other plasticizer used in making the TPS. By varying upwards the amount of glycerol, TPS domains were observed as becoming smaller. Diminishing the amount of glycerol made the TPS domains grow larger. Thus, depending of the chosen applications be it film article, molded article or other plastic product, the size of the TPS domain and the mechanical properties of the finished article may be controlled within at least 0.2 to 4 microns and preferably 0.5 to 1.5 microns.

Although the present invention has been described hereinabove by way of preferred embodiments thereof, it can be modified, without departing from the spirit and nature of the subject invention as defined in the appended claims.

REFERENCES

1. D. Bikiaris, J. Prinos, K. Koutsopoulos, N. Vouroutzis, E. Pavlidou, N. Frangi, C. Panayiotou "LDPE/plasticized starch blends containing PE-g-MA copolymer as compatibilizer" *Polymer Degradation and Stability* 59: 287~291 (1998).
2. D. Bikiaris, C. Panayiotou "LDPE/Starch Blends Compatibilized with PE-g-MA Copolymers" *Journal of Applied Polymer Science* 70: 1503-1521 (1998).
3. Shujun Wang, Jiugao Yu, Jinglin Yu "Compatible thermoplastic starch/polyethylene blends by one-step reactive extrusion" *Polym Int* 54:279-285 (2005).
4. St-Pierre N., Favis B. D., Ramsay B. A., Ramsay J. A., Verhoogt H. "Processing and characterization of thermoplastic starch/polyethylene blends" *Polymer* 38(3): 647-655 (1997).
5. F. J. Rodriguez-Gonzalez, B. A. Ramsay, B. D. Favis "High performance LDPE/thermoplastic starch blends: a sustainable alternative to pure polyethylene" *Polymer* 44: 1517-1526 (2003).
6. F. J. Rodriguez-Gonzalez, N. Virgilio, B. A. Ramsay, B. D. Favis "Influence of Melt Drawing on the Morphology of One and Two-Step Processed LDPE/Thermoplastic Starch Blends" *Advances in Polymer Technology* 22(4): 297-305 (2003).
7. J. S. Yi, G.-H. Hu, M. Lambla, H. K. Kotlar, "In situ compatibilization of polypropylene and poly(butylene terephthalate) polymer blends by one-step reactive extrusion" *Polymer* 37: 4119-4127 (1996).

TABLE 9

| Reference | PE/TPS 95/5 | | | PE/TPS 90/10 | | | PE/TPS 80/20 | | | PE/TPS 70/30 | | |
|---|---|---|---|---|---|---|---|---|---|---|---|---|
| | $d_n$ | d at peak height | range | $d_n$ | d at peak height | range | $d_n$ | d at peak height | range | $d_n$ | d at peak height | range |
| 1 (prior art) | | 5-10 μm | | | 30 μm$^a$ | | | | | | 60-70 μm | |
| 2 (prior art) | | | | | 8 μm | | | 33 μm | | | 50 μm* | |
| 3 (prior art) | | | | | | | | | | | 6-10 μm* | |
| 4 (prior art) | 3 μm$^b$ | | | | | | 7 μm$^c$ | | | 8 μm$^d$ | | |
| 5 (prior art) | | | | | | | | | | | Not reported | |
| 6 (prior art) | $d_v$ = 1.5 μm$^e$ No $d_n$ reported | | | | | | $d_v$ = 3.8 μm No $d_n$ reported | | | $d_v$ = 6.6 μm$^f$ No $d_n$ reported | | |
| 7 (present invention) | 0.9 μm$^g$ | 0.5 μm$^g$ | 0.2-2.6 μm$^g$ | 0.7 μm$^h$ | 0.5 μm$^h$ | 0.2-3.0 μm$^h$ | | | | 0.7 μm | 0.5 μm | 0.2-2.5 μm |

Note:
*estimated from its SEM pictures.
$^a$PE/TPS 85/15;
$^b$PE/TPS 93/7;
$^c$PE/TPS 78/22;
$^d$PE/TPS 61/39;
$^e$PE/TPS 94/6;
$^f$PE/TPS 68/32;
$^g$PE/TPS 94/6;
$^h$PE/TPS 88/12;

What is claimed is:

1. A composition of matter comprising a blend of discontinuous and discrete thermoplastic starch domains in a synthetic polymer phase, the synthetic polymer being an aliphatic-aromatic polyester copolymer or a polyolefin polymer, the thermoplastic starch domains having localized therein a plasticizer in sufficient amount to effect plasticization of said domains and the plasticized thermoplastic starch domains having an average diameter of about 0.2 to about 1.5 microns, wherein the thermoplastic starch is present in a proportion of 0.1 wt % to about 30 wt % based on the total weight of the composition and the water content in said thermoplastic starch is not more than about 1 wt %, and wherein said composition is free of compatibilizer.

2. The composition of matter according to claim 1 wherein (i) if the composition of matter is in the form of a film article, dart test limit and/or tear strength limit is maintained at a level of about 60% or more, or improved, in comparison to unblended pure synthetic polymer processed and tested in the same way, and (ii) if the composition of matter is in the form of a molded article, the notched and/or unnotched Izod impact strength test limit is maintained at a level of about 60% or more or improved in comparison to unblended pure synthetic polymer processed and tested in the same way.

3. The composition of matter according to claim 2 wherein the composition of matter is in the form of a film article and the dart test limit and/or tear strength limit is maintained at a level of 80% or more, or improved, in comparison to unblended pure synthetic polymer processed and tested in the same way.

4. The composition of matter according to claim 2, wherein the composition of matter is in the form of a molded article, and the notched and/or unnotched Izod impact strength test limit is maintained at a level of 80% or more, or improved, in comparison to unblended pure synthetic polymer processed and tested in the same way.

5. The composition of matter of claim 1 wherein the plasticizer is glycerol.

6. The composition of matter according to claim 5 having a residual water content of 0.3 wt % or less of the composition.

7. The composition of matter according to claim 1 wherein the thermoplastic starch is present in a proportion of 10 wt % to 30 wt % based on the total weight of the composition.

8. The composition of matter according to claim 1 wherein the thermoplastic starch is present in a proportion of 15 wt % to 25 wt % based on the total weight of the composition.

9. The composition of matter according to claim 1 having a residual water content of 0.3 wt % or less of the composition.

10. The composition of matter according to claim 1, wherein the plasticizer is present in a proportion of about 24 wt % to about 40 wt % based on the total weight of thermoplastic starch.

11. The composition of matter according to claim 1, wherein the plasticizer is present in a proportion of about 24 wt % to about 36 wt % based on the total weight of thermoplastic starch.

12. The composition of matter of claim 10, wherein the plasticizer is glycerol.

13. The composition of matter of claim 11, wherein the plasticizer is glycerol.

* * * * *